(12) United States Patent
Kelly et al.

(10) Patent No.: US 10,816,445 B2
(45) Date of Patent: Oct. 27, 2020

(54) PARTICLE SENSOR AND PARTICLE SENSING METHOD

(71) Applicant: KONINKLIJKE PHILIPS N.V., Eindhoven (NL)

(72) Inventors: Declan Patrick Kelly, Shanghai (CN); Michael Martin Scheja, Shanghai (CN); Shuang Chen, Shanghai (CN); Cornelis Reinder Ronda, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/619,138

(22) PCT Filed: Jun. 20, 2018

(86) PCT No.: PCT/EP2018/066476
§ 371 (c)(1),
(2) Date: Dec. 4, 2019

(87) PCT Pub. No.: WO2018/234408
PCT Pub. Date: Dec. 27, 2018

(65) Prior Publication Data
US 2020/0116604 A1    Apr. 16, 2020

(30) Foreign Application Priority Data
Jun. 21, 2017  (WO) ................ PCT/CN2017/089329
Aug. 14, 2017  (EP) ...................................... 17186088

(51) Int. Cl.
*G01N 1/40* (2006.01)
*B01L 3/00* (2006.01)
(Continued)

(52) U.S. Cl.
CPC ...... *G01N 1/4022* (2013.01); *B01L 3/502715* (2013.01); *B01L 3/502776* (2013.01);
(Continued)

(58) Field of Classification Search
CPC ............. G01N 1/4022; G01N 21/1702; G01N 29/2425; G01N 7/16; G01N 27/12;
(Continued)

(56) References Cited

U.S. PATENT DOCUMENTS 6,023,324 A    2/2000  Myers
7,467,541 B2 *  12/2008  Konzelmann .......... G01N 25/18
                                                    73/25.01
(Continued)

FOREIGN PATENT DOCUMENTS

JP    S57131036    8/1982
JP    6083660    2/2017
WO    2016/156035    10/2016

OTHER PUBLICATIONS

International Search Report and Written Opinion dated Sep. 18, 2018 for International Application No. PCT/EP2018/066476 Filed June 20, 2018.

(Continued)

*Primary Examiner* — Suman K Nath (57) ABSTRACT

A particle sensing system is for sensing particles entrained in a fluid. The system comprises a flow channel having a longitudinal direction along which the fluid is to be passed, a heating arrangement for heating the fluid and thereby applying a positive thermophoretic force on the fluid in a direction perpendicular to the longitudinal direction of the flow channel and a first sensor for sensing the particles in the fluid after heating by the heating arrangement. The thermophoretic force increases the concentration of the particles at the first sensor.

19 Claims, 3 Drawing Sheets

(51) Int. Cl.
  *B01L 7/00* (2006.01)
  *G01N 15/06* (2006.01)
  *G01N 15/00* (2006.01)

(52) U.S. Cl.
  CPC ............... *B01L 7/00* (2013.01); *G01N 15/06* (2013.01); *B01L 2200/0636* (2013.01); *B01L 2300/0627* (2013.01); *B01L 2300/1805* (2013.01); *B01L 2400/0451* (2013.01); *G01N 2015/0046* (2013.01); *G01N 2015/0693* (2013.01)

(58) Field of Classification Search
  CPC ........ G01N 25/00; G01N 15/06; G01N 15/14; G01N 15/00; G01N 2015/0693; G01N 15/0046; B01L 7/00; B01L 3/502715; B01L 3/502776; B01L 2200/0636; B01L 2300/0627; B01L 2300/1805; B01L 2400/045
  See application file for complete search history.

(56) References Cited

U.S. PATENT DOCUMENTS

| | | | |
|---|---|---|---|
| 7,752,885 B2* | 7/2010 | Huang | G01F 1/667 |
| | | | 73/23.2 |
| 10,309,932 B2* | 6/2019 | Sinha | G01N 29/036 |
| 10,520,413 B2 | 12/2019 | Jongerius | |
| 2003/0159932 A1 | 8/2003 | Betts | |
| 2013/0186269 A1* | 7/2013 | Cheng | B01D 53/228 |
| | | | 95/47 |

OTHER PUBLICATIONS

Paprotny, et al: "Microfabricated air-microfluidic sensor for personal monitoring of airborne particulate matter", Design, fabrication, and experimental results, Sensors and Actuators A201, 506-516, 2013.

Wikipedia, "Photophoresis", last updated Jul. 2019 https://en.wikipedia.org/wiki/Photophoresis.

Wurm, et al: "Experiments on the Photophoretic Motion of Chondrules and Dust Aggregates—Indications for the Transport of Matter in Protoplanetary Disks", vol. 208, Issue 1, Jul. 2010, pp. 482-491 https://arxiv.org/ftp/arxiv/papers/1003/1003.2924.pdf.

Ashkin, et al: "Optical trapping and manipulation of viruses and bacteria", Science Mar. 20, 1987, vol. 235, Issue 4795, pp. 1517-1520, Abstract.

Geelhoed, et al: "Thermophoretic Particle Separation in Microfluidics" 2006 Institution of Chemical Engineers www.icheme.org/cherd Trans IChemE, Part A, May 2006 https://www.researchgate.net/publication/267971351_Thermophoretic_Particle_Separation.

Ding, et al: "On-chip manipulation of single microparticles, cells, and organisms using surface acoustic waves", PNAS Jul. 10, 2012 109 (28) 11105-11109 http://www.pnas.org/content/109/28/11105.long.

Wikipedia, "Dielectrophoresis", last updated Sep. 2019 https://en.wikipedia.org/wiki/Dielectrophoresis.

Wikipedia, "Optical tweezers", last updated Dec. 2019 https://en.wikipedia.org/wiki/Optical_tweezers.

Wikipedia, "Acoustic tweezers", last updated Oct. 2019 https://en.wikipedia.org/wiki/Acoustic_tweezers.

* cited by examiner

PARTICLE SENSOR AND PARTICLE SENSING METHOD

FIELD OF THE INVENTION

This invention relates to sensors for detecting particles in a fluid flow and methods for detecting particles using such sensors.

BACKGROUND OF THE INVENTION

Airborne particle pollution, especially particle matter having a diameter less than 2.5 μm (named "PM2.5"), is a big concern for countries like China, where the speed of industrialization stretches the boundaries of regulatory requirements relating to air quality.

As a consequence of increasing consumer empowerment, the demand for information about the air quality of living spaces is increasing. Especially in China, excessive PM2.5 pollution has become a common problem in the last decade. This problem is also validated by continuous measurements in various Chinese cities. The data is publicly available and can be simultaneously monitored by mobile phone applications or through the web.

Availability of this data as well as continuous national and international media attention has created strong consumer awareness about the problem.

Official outdoor air quality standards define particle matter concentration as mass concentration per unit volume (e.g. μg/m3). The average PM2.5 pollution concentration in mainland China has been calculated based on satellite data, and it has been found that the majority of the country exceeds the World Health Organization limits of 10 μg/m3, with some regions reaching and even exceeding PM2.5 concentrations of 100 μg/m3.

Low cost particle sensors are for example based on the measurement of light scattered by the particles which are entrained by an air flow through a detection volume. The light is generated by LEDs or lasers and creates a focused beam which is crossed by the particles to be sensed. The air flow is for example induced by a fan for a forced air flow or a heater for a convection air flow. Optical particle sensors typically give a particle count as the sensor output, and this information is then converted to a mass concentration. Particle sensors are also being developed using self-mixing interferometry, by which scattered light from a detected particle enters the laser and causes a modulation of the laser power.

Particle sensors of these types, based on scattering from LEDs or lasers, take time at low concentrations to give a stable reading. However, certain types of particle in air are found at very low concentrations. For example, pollen levels are considered high when more than, for example, 40 particles/m3 are present. Furthermore these optical sensors only detect particles in a certain volume of the air so that relatively low readings are obtained.

The long time to reach a stable value means the user has to wait a long time before a stable and reliable reading is obtained. In order to detect more particles at low concentrations, the flow rate (the sampled air volume per unit of time) needs to be increased. This would require larger air pumps which would increase the size of the sensor.

A sensor that can selectively sense specific particles like pollen is likely to face problems in practice due to their low concentration levels in the air.

US 2003/0159932 discloses a sensor system for sensing a low concentration of particles. An actuator is used to implement a channel narrowing so that the particle concentration is increased. However, this introduces an additional flow restriction, which affects the general fluid flow through the sensor.

JP S57 131036 discloses a particle counting system based on light scattering in which thermophoresis is used to concentrate particles in an axial direction so that a small light detection area may be used.

SUMMARY OF THE INVENTION

There is therefore still a need for a particle sensor which can provide a stable reading more quickly when detecting particles at low concentrations, and without adversely affecting the flow through the sensor.

The invention is defined by the claims.

According to a first aspect of the invention, there is provided a particle sensing system for sensing particles entrained in a fluid, comprising:

a detection volume located within a flow channel through which the fluid is to be passed in a longitudinal direction;

a heating arrangement for generating a thermal gradient perpendicular to the fluid flow direction thereby applying a positive thermophoretic force to particles entrained in the fluid; and a sensor for sensing the particles in the fluid at the detection volume wherein the thermophoretic force is used to constrict the the space occupied by the particles within the flow and thereby concentrate the particles within the detection volume, wherein the heating arrangement is adjustable to provide different levels of thermophoretic force on the fluid, and wherein the system further comprises a controller which is adapted to:

obtain an initial particle concentration measurement with no heating; and control the heating arrangement in dependence on the initial particle concentration measurement.

The increase in particle concentration is able to take place without increasing the resistance of the flow channel to the fluid flow. The detection volume is at an end portion or directly at the end of the thermal gradient within the flow channel.

The detection volume is a sub-region of the flow channel, so that the particle concentration is increased in the detection volume but decreased in the remainder of the flow channel. The particles are constricted by the thermophoretic force which means a force is applied from at least two opposite sides to create a funneling effect. Thus, the particles are not simply moved as a general flow, but the shape of the flow of particles is controlled to provide a flow which is narrowed from at least two opposite sides. The detection volume is for example surrounded by the remainder of the flow channel, so the constriction is preferably radially inwardly within the flow channel. In particular, there is a fully open space between the detection volume and the inner wall of the conduit which defines the flow channel.

The sensor is preferably remote, i.e. its hardware is outside the flow channel so that the sensor itself also does not provide any resistance to the flow. The sensor is for example optical so that the detection volume is an optical analysis region.

The thermophoretic force is a phenomenon observed in mixtures of mobile particles where the different particle types exhibit different responses to the force of a temperature gradient. Thermophoresis is applicable to particle detection for particulate pollutants and pollen. The heated particles create a fast flow away from the heat source down the temperature gradient, based on the kinetic energy which has been acquired by the particles. The invention makes use of so-called positive thermophoresis, by which the particles of interest move from the hot to cold region. Lighter or smaller species in the fluid may exhibit negative behavior to fill the void vacated by the particles of interest. In this way, the overall flow cross section is not changed, and hence the overall flow rate along the longitudinal direction remains the same, but the particles of interest are spatially concentrated. In this way, the concentration of particles detected at the sensor is increased.

When detecting a low concentration of particles, the time taken for the sensor to provide a stable reading is decreased. The use of thermophoresis to concentrate the particles is particularly advantageous because the heating, for creating the required temperature gradient, is easily controlled and has a low cost of implementation.

The heating arrangement is adjustable to provide different levels of thermophoretic force on the fluid.

The adjustable heating arrangement allows the force to be varied, and therefore the extent of the increased concentration of the particles at the detection volume to be varied. The appropriate level of heat is for example dependent on the prevailing concentration of particles. If the concentration of particles is low, a higher level of heat will be appropriate. However, if the concentration of particles is higher, a lower level of heat, and possibly no heat at all, will be appropriate. The level of heat can be varied in use, after the initial reading is attempted by the sensor, as appropriate for a particular fluid. Power savings are obtained by using the heating only when needed, and it can also be ensured that, in the event of high concentrations, the sensor is not saturated.

The heating arrangement may comprise a plurality of independently controllable heating elements. The use of multiple independently controllable heating arrangements provides a simple way to provide adjustment of the heating arrangement.

The detection volume preferably has a smaller cross sectional area than that of the flow channel. The fluid flow is along the flow channel. The fluid enters the flow channel and flows past the heating element, which heats the fluid, and the temperature gradient thereby alters the distribution of particles in the fluid, providing an increased particle concentration in the detection volume.

A flow controller may be provided for controlling the flow speed of fluid through the flow channel.

The heating arrangement may comprise a coil or set of coils surrounding the flow channel By providing a coil surrounding the flow channel, the fluid is heated equally from all directions, thereby concentrating the fluid to the center of the flow channel where the detection volume is positioned.

The longitudinal direction may be vertical (or slightly offset from the vertical without changing the function, for example by less than 10 degrees), and the heating arrangement is adapted to generate the flow through the flow channel. In this way, the heating arrangement generates both the convective heat flow (as an updraft) through the flow channel (of the particles entrained in their carrier gas i.e. air) as well as the thermophoretic heat gradient for controlling the distribution of particles.

The sensor may comprise an optical sensor. The optical sensor may use light scattering or light reflection to assess particle concentration, for example through a transparent wall of the flow channel.

The system may comprise a second sensor for sensing the particles in the fluid before heating by the heating arrangement. Therefore, the particle concentration can be determined before and after the thermophoretic force is applied to concentrate the particle distribution.

The system may be a particle sensing system for sensing particles in a fluid which is air. The system may be a particle sensing system for sensing pollen.

Pollen is often present in air at low concentrations. Therefore, the present system, which is adapted to overcome problems associated with detecting particles at low concentrations, is particularly useful for detecting levels of pollen in air. However, the system is also useful for determining levels of other particles, such as bacteria and viruses.

In a second aspect, the invention provides a particle sensing method for sensing particles entrained in a fluid, comprising:

passing a fluid having entrained particles along a longitudinal direction of a flow channel;

obtaining an initial particle concentration measurement at a detection volume of the flow channel;

heating the fluid by an amount which depends on the initial particle concentration measurement and thereby applying a positive thermophoretic force on the fluid including a component in a direction perpendicular to the longitudinal direction of the flow channel; and sensing the particles at a detection volume of the flow channel, wherein the thermophoretic force provides a constricted space occupied by the particles within the flow and thereby increases a concentration of the particles at the detection volume.

As discussed in relation to the system, by heating the fluid, the concentration of particles at the detection volume may be increased and the time to obtain a stable reading thereby decreased.

The method may comprise adjusting the heating to obtain a stable sensing result.

Depending on the concentration of particles, a different level of heat and therefore thermophoretic force may be appropriate. If the particle concentration is particularly low, the heating may need to be increased in order to provide a stable reading. Alternatively, if the particle concentration is higher, the sensor may be saturated and the heating may need to be reduced or even switched off, in order to provide an appropriate reading.

The method may comprise sensing the particles with a second sensor before heating the particles. Therefore, the particle concentration can be determined before and after the thermophoretic force is applied to concentrate the fluid.

The method may be for sensing particles entrained in a fluid which is air. The method may be for sensing particles which are pollen.

Pollen is often present in air at low concentrations. Therefore, the present system, which is adapted to overcome problems associated with detecting particles at low concentrations, is particularly useful for detecting levels of pollen in air.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a particle sensing system for sensing particles entrained in a fluid. The system comprises a flow channel having a longitudinal direction along which the fluid is to be passed, a heating arrangement for heating the fluid and thereby applying a positive thermophoretic force on the fluid in a direction perpendicular to the longitudinal direction of the flow channel and a sensor for sensing the particles in the fluid after heating by the heating arrangement. The sensor has a detection volume, and the thermophoretic effect is used to increase the particle concentration in the detection volume.

The use of thermophoresis is known for inducing particles in air to deposit on the surface of a mass sensor. For example reference is made to I. Paprotny, F. Doering, P. A. Solomon, R. M. White, and L. A. Gundel, "Microfabricated air-microfluidic sensor for personal monitoring of airborne particulate matter": Design, fabrication, and experimental results, Sensors and Actuators A201, 506-516, 2013.

This invention is based on the use of thermophoresis to control a particle concentration in a detection volume of a sensor, such as a sensor based on optical scattering.

Figure 1:
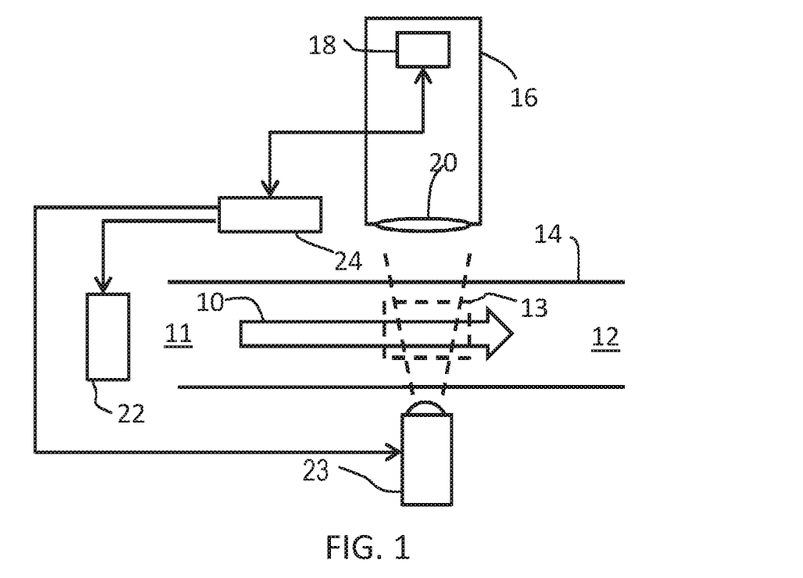
FIG. 1 shows a known particle sensing system.

FIG. 1 shows an example of an optical sensor to which the invention may be applied. There is a fluid (gas) flow 10 from an inlet 11 of a flow channel 14 to an outlet 12 of the flow channel 14. The flow channel is formed by a conduit, which has a length along the longitudinal direction between the inlet 11 and outlet 12. Within the general flow channel, there is a detection volume 13. The detection volume has a smaller cross section (as viewed in the direction along the fluid flow 10) than the general flow channel. This means that some particles in the flow channel will pass through the detection volume and be detected by the particle sensor and others will not. Although shown as a 3D volume, the detection volume may in fact comprise a generally planar area, wherein particles are detected when they cross the plane.

In one example, an infrared LED 23 ($\lambda$=890 nm) is used to illuminate the fluid flow to enable optical detection of entrained particles based on optical measurements of scattering. The LED is to one side of the detection volume 13 and the sensing is carried out at the opposite side. An alternative design may make use of the reflection of light.

The optical sensor 16 comprises a photodiode sensor 18 and a focusing lens 20 at which scattered light is collected.

A flow control device 22, shown schematically in FIG. 1, is used for inducing flow through the sensor device. It may comprise a fan, or a heater may instead be used to create a convective heat flow. In a system using heating, the resulting buoyancy causes air to flow towards the top of the detector, carrying the particles through the flow channel. In such a case, the longitudinal direction may be vertically upwards.

A controller 24 controls the processing of the sensor signals and operation of the flow control device and light source.

The detection volume 13 is formed at transparent portions of the conduit which defines the flow channel 14, which allow the light to pass through the conduit. The conduit may be part of a housing which is placed on a printed circuit board with the electronics to convert the signal due to the particles into a count. Leakage of LED light directly towards the photodiode sensor, which would give a background signal, is minimized and electronic filtering of any DC signal may be used to create a pulsed particle signal.

The sensor may be used to provide a particle count for particles of a particular size. For example, the pulsed particle signal is amplified and compared with a threshold voltage. Above a certain particle size, the pulse height is sufficient to pass the threshold. The threshold thus implements a band pass filtering function. The pulse is counted and the pulse length is measured, resulting in a low-pulse occupancy time (LPO %).

A sensor of this type may thus provide a simple particle count (i.e. a count of the number of detection peaks which exceed the threshold set) as well as a low pulse occupancy measure which enables particle size information to be obtained. The threshold is for example implemented as a threshold voltage applied to a comparator which controls the particle size sensitivity of the sensor system. By adjusting the threshold, particle size bins may be defined to enable particle size distribution information to be obtained.

The sensor thus basically comprises flow passageway having an inlet and an outlet with a gas flow between them, a light source and an optical detector for making optical scattering measurements within a detection volume along the passageway, wherein the detector signal is correlated with particle size. If an adjustable threshold is used, particle size information may be obtained.

Further details of the design and operation of optical particle sensors of this type will be well known to those skilled in the art.

When a low concentration of particles is to be sensed, a long time may be required for the sensor to provide a stable output.

The invention provides increased particle concentration by using the thermophoretic effect. The effect may be used permanently or it may be selectively used. For example, when detecting a low concentration of particles, the system may then allow the time taken for the sensor to provide a stable reading to be decreased because a higher number of particles are detected by the sensor. Thus the effect may be used only during initial stabilization, or continuously but only when there is a low particle concentration or it may be used permanently.

It should be understood that the term "increased particle concentration" includes an increase from 0 (no particles in the detection volume 13) to 1 particle in the detection volume. Indeed, for detection of particles with only a small number of particles per m3, it is most likely that there will be either 0 particles or 1 particle in the detection volume at any time. The effect of the thermophoretic heating may thus be considered as a way of improving the probability that a given particle passes through the detection volume 13, in particular when the detection volume occupies only a fraction of cross sectional area of the general flow channel (i.e. the flow passageway), as can be seen in FIG. 1.

The invention is of particular interest for low concentrations. This may arise if a particular particle type has been isolated for example by selective filtering.

In order to isolate pollen, for example, a UV LED may be used, to excite luminescence (by the pollen). The resulting luminenscence is in general indicative of bio materials, such as pollen. Thus, by detecting only certain wavelengths (using wavelength selective filters) signals for specific bio material types may be identified.

Pollen particles for example have a size of >30 μm and are therefore larger than particles counted in PM2.5 or PM10 devices. When distributed heating is performed, over a certain length, the pollen will therefore concentrate after a longer distance than the smaller particles.

The sensor can be calibrated using fluids including known concentrations of particles, so a reading at the sensor following application of a particular level of heating can be converted to a particular particle concentration. Alternatively, a concentration factor can also be calculated using computational fluid dynamics methods under the particular conditions.

The use of thermophoresis to concentrate the particles is particularly advantageous because heating is easily controlled and has a low cost of implementation.

Figure 2:
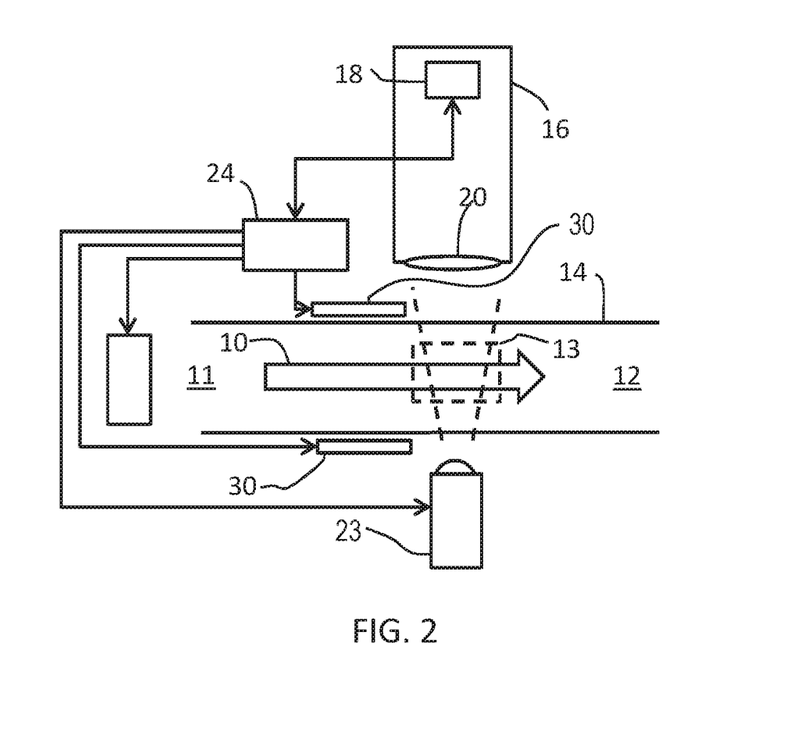
FIG. 2 shows a first example of a particle sensing system as a modification to the system of FIG. 1.

FIG. 2 shows one embodiment of the system as a modification to the system of FIG. 1. The same reference numbers are used as in FIG. 1 for the same components, and a description is not repeated.

A heating element 30 is provided for generating a heating gradient within the internal volume of the flow channel 14. In a simplest implementation, there may be a heating element at one location at the outer or inner wall of the conduit which defines the flow channel 14, so that a temperature gradient is created away from that location. Preferably, the heating element is around the conduit which defines the flow channel 14 (represented in FIG. 2 by heating element portions on opposite sides of the flow channel 14 in the cross section shown). Thus, there is a temperature gradient from the outer periphery of the flow channel to the center. The fluid flows along the longitudinal direction of the flow channel past the heating element 30, which heats the fluid, and the resulting thermophoretic force drives the particles of the size of interest towards the center of the conduit, where the detection volume 13 is located. By way of example, the radius of the concentrated particle flow directed to the detection volume may be half of the original flow channel radius, giving an reduction in area of a factor of 4 and a corresponding increase in concentration.

The detection volume may be at the center, or for a horizontal conduit as shown, it may be set below the center to take account of gravitational effects.

The heating element 30 is upstream of the detection volume 13 so that the particles have moved once they reach the detection volume 13. The heating element may end before the detection volume 13 or it may overlap with the detection volume 13.

Note that the thermophoretic force follows the temperature gradient, and is thus generally perpendicular to the longitudinal direction of the flow channel and the direction of flow of the fluid. However, in practice, there is also a temperature gradient from the warmer region of the flow channel at the location of the heating element 30 to the ends of the flow channel which are at ambient temperature. Thus, the force will in practice be inclined (typically by an acute angle) to the perpendicular direction of the flow channel. The terms "perpendicular" and "longitudinal direction of the flow channel" should be understood accordingly. In particular, the thermophoretic force will at least have a component which is perpendicular to the longitudinal direction of the flow channel and the direction of flow of the fluid.

In general, the larger particles in a mixture move from hot areas to cooler areas (and smaller particles move the opposite way). This method is thus very suitable for the detection of larger particles, like pollen.

Typically, the cross-sectional area of the flow channel is in the order of a few mm2 only, and the detection volume is correspondingly smaller.

Figure 3:
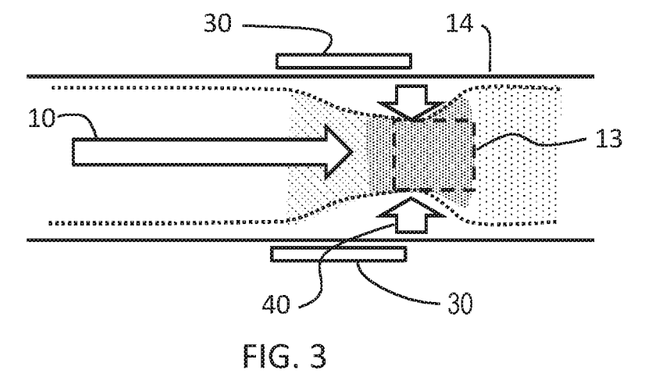
FIG. 3 shows the effect of the heating arrangement on the particle distribution.

FIG. 3 shows the effect of the thermophoretic force. The force is shown as 40. As schematically shown, the particle concentration for the particles of interest increases within the detection volume 13 and decreases radially away from the flow channel. The key is to apply a force on the fluid to push the particles into a flow having a reduced cross sectional area and thereby concentrate the particles.

The known alternative of physically reducing the flow channel/detection volume size does not have the same effect because this reduces the overall fluid flow rate, because the overall flow resistance has increased. By using thermophoresis, the volume in which the particles of interest are contained is compressed to a narrower channel without reducing the overall flow rate.

Figure 4:
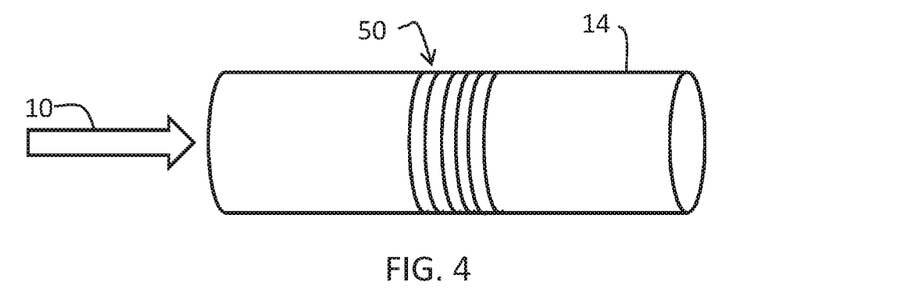
FIG. 4 shows one possible heating arrangement.

FIG. 4 shows a possible implementation of the heating element as a coil 50 surrounding the flow channel, upstream of the detection volume. Because the coil surrounds the flow channel, the fluid is heated equally from all directions, thereby concentrating the fluid to the center of the detection volume 13.

Figure 5:
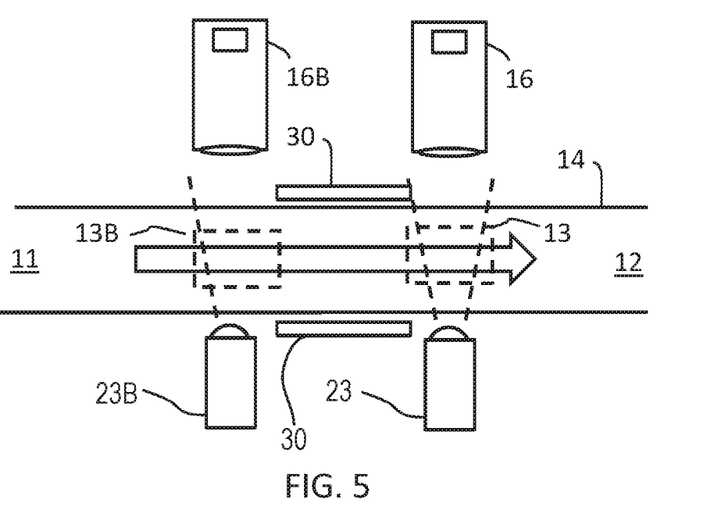
FIG. 5 shows a second example of a particle sensing system as a modification to the system of FIG. 1.

FIG. 5 shows a further example of the system. In this example, the system comprises a second sensor 23B, 16B with a detection volume 13B for sensing the particles in the fluid before heating by the heating element 30. The use of two sensor readings allows a measurement to be made before and after the thermophoretic force is applied to concentrate the fluid.

Using this method, the overall particle concentration factor can be obtained. When the particle concentration before the concentration increasing area is too high, the readings of the second sensor may be discarded (because of saturation) and the heating current is then reduced. When the initial particle concentration is very low, the heating current can be increased to increase the particle count. The sensor accuracy and/or the sensing speed therefore can be increased.

The heating element may have variable output power to enable variable heating to be provided.

Figure 6:
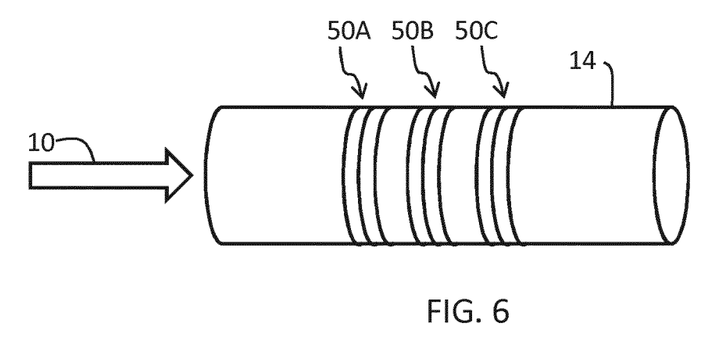
FIG. 6 shows another possible heating arrangement with a set of independently controllable heating elements.

FIG. 6 shows instead that the heating element may be divided into sections, shown as three separate coils 50A, 50B, 50C. Thus, this example of the system comprises a series of heating arrangements along the longitudinal direction of the flow channel. They may be arranged in a sequence along the flow channel (as schematically shown in FIG. 6) so that they provide heating at slightly different locations, or they may be interleaved with each other so that they provide their heating power to the same longitudinal region of the flow channel.

These separate coils may be switched on and off independently. There may then be no need for analog control. The adjustable heating (whether analog or using discrete heating elements) allows the degree of compression of the particle flow to be controlled. It may be controlled dynamically in dependence on the sensor reading. If there is a high sensor reading, less (or no) heat is used to save power and to avoid saturating the sensor. If there is a low sensor reading, more heat is used. The sensor output is calibrated in dependence on the heat applied in order to derive the final sensor output.

As mentioned above, it is known that heating may be used to create the required flow through the flow channel. The heating element used for creating the thermophoretic effect may also be used to provide the flow along the flow channel. For this purpose, the channel is arranged vertically, and the longitudinal direction of the flow channel is thus also positioned vertically, to generate a vertically upward flow 10. The particles are concentrated in the center of the flow channel at the location of the detection volume.

The longitudinal direction may be offset from the vertical by a small amount without changing the functionality.

The heating then has two effects. One is to cause air flow through the flow channel and the other is concentrate particles in the detection volume of the sensor. At very high concentrations it is possible to overload the sensor (too many particles mean that an accurate result is not recorded) and at too low a level the sensor does not give a stable reading (too few particles pass through the sensing area).

The heating element enables both factors to be controlled with a single mechanism. More heat causes a faster air flow and higher particle concentration (suitable for low levels of pollution) and less heat causes a slower air flow and lower particle concentration (suitable for high levels of pollution). Therefore, it becomes possible to ensure that the amount of particles seen by the sensor is within an optimum range and by adjusting the sensor output based on the control signal, calculate the actual value.

Figure 7:
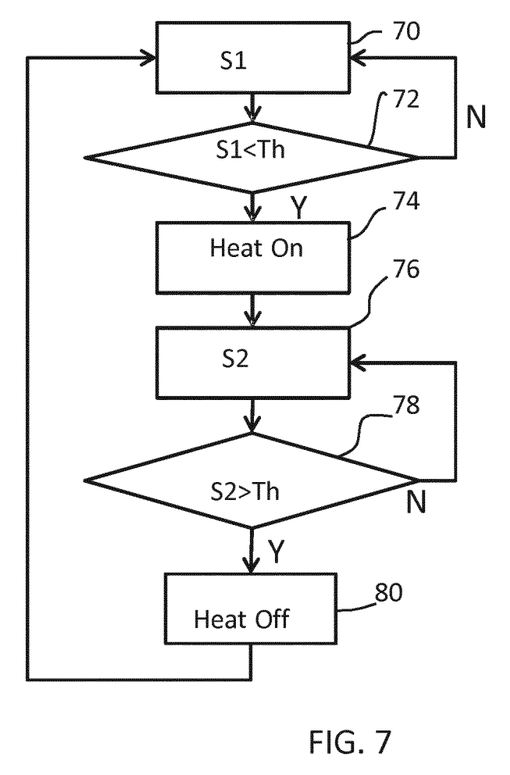
FIG. 7 shows a flow chart demonstrating a particular use of the system of the invention.

FIG. 7 shows a flow chart describing a possible use of the system and method.

In step 70 a first particle concentration measurement is obtained (S1).

In step 72, it is determined if the signal is weak (below a threshold Th) or not. If there is a strong enough signal, the method returns to step 70 for a next measurement.

If there is a weak signal, the thermophoretic heating is applied in step 74 and a second particle concentration measurement (S2) is obtained in step 76.

In step 78, it is determined if the signal is now strong (above the threshold Th or another threshold) or not. If there is a strong enough signal, the heater is turned off in step 80 and the method returns to step 70 for a next measurement.

If there is a weak signal, the process returns to step 76 for a next measurement with the thermophoretic heating still applied.

This method provides heating on or off, but it may be extended to provide different levels of heating depending on the particle concentrations measured.

In this way, depending on the concentration of particles measured, a different level of heat and therefore thermophoretic force may be appropriate.

The force may be controlled to have one of two levels i.e. on/off, or within an analog range from zero to a maximum. The heating may be pulsed over time, so the sensor is able to measure the particle concentration with and without thermophoretic concentration and with only one sensor. For a multiple segment heating arrangement, the segments can be independently switched on or off or controlled within a power range to provide a continuous range of adjustment.

The fluid may be driven through the flow channel by a fan, although other gas propagation means may be used such as an ionic wind or a thermal draft as has already been mentioned above.

In the system, the sensor preferably comprises an optical sensor as discussed above. The optical sensor may use light scattering or light reflection to assess particle concentration, for example through a transparent wall on the flow channel.

The system may be a particle sensing system for sensing particles in any fluid. In one embodiment the particle sensing system is for sensing particles in a fluid which is air. The system may be a particle sensing system for any type of particles, for example pollen, bacteria and viruses. Pollen are important allergens that may have a serious impact on people's well-being. In addition, they are asthma triggers. To prevent or minimize human exposure, it is important to detect pollen to which humans may be exposed. The information obtained can be used to prompt other actions, for example to vacuum clean the enclosure in which the sensitive person resides or to clean surfaces in such an enclosure. This may be performed automatically, or an alert may be provided to a user to perform the cleaning action manually. Pollen is often present in air at low concentrations. Therefore, the system, which is adapted to overcome problems associated with detecting particles at low concentrations, is particularly useful for detecting levels of pollen in air.

The sensor may be integrated into an air purifier or provided as an external component. The invention is of primary interest in homes and offices, but it is generally of interest for any space where it is desired to know the concentration of specific particles.

The heating element has been shown in the examples above outside the flow channel, thus heating through the outer wall of the passageway. It may of course be internal to the flow channel without changing the function of the invention as described above.

One example of sensor configuration has been given above. The invention is however applicable to any sensor in which a sensor volume is defined within a larger flow passageway. The invention avoids the need to provide any control of the physical size of the flow passageway for example using mechanical actuators, and thus provides a low cost way to generate a concentrated particle volume.

The invention is not limited to the use of optical scattering sensors. Sensors may be based on cameras and image recognition or based on fluorescence detection of particles, or based on light attenuation. Fluorescence may of of particular relevance for detection of biological particles such as bacteria and pollen. The degree of polarization can also be used to "separate" pollen from other particles.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A particle sensing system for sensing particles entrained in a fluid, comprising:
   a detection volume located within a flow channel through which the fluid is to be passed in a longitudinal direction, wherein the detection volume is a sub-region of the flow channel;
   a heating element for generating a thermal gradient perpendicular to a direction of fluid flow to apply a positive thermophoretic force to particles entrained in the fluid, wherein the heating element is adjustable to provide different levels of thermophoretic force on the fluid;

a sensor for sensing the particles in the fluid at the detection volume, wherein the positive thermophoretic force is used to constrict a space occupied by the particles within the fluid flow and thereby concentrate the particles within the detection volume; and a controller which is adapted to: obtain an initial particle concentration measurement with no heating; and control the heating element in dependence on the initial particle concentration measurement.

2. The system as claimed in claim 1, wherein the heating element comprises a plurality of independently controllable heating elements.

3. The system as claimed in claim 1, wherein the detection volume has a smaller cross sectional area than that of the flow channel.

4. The system as claimed in claim 1, wherein the heating element comprises a coil or a set of coils surrounding the flow channel.

5. The system as claimed in claim 1, wherein the longitudinal direction is vertical or near vertical and the heating element is adapted to generate the fluid flow through the flow channel.

6. The system as claimed in claim 1, wherein the sensor comprises an optical sensor.

7. The system as claimed in claim 1, wherein the system comprises a second sensor for sensing the particles in the fluid before heating by the heating element.

8. The system as claimed in claim 1, wherein the system is a particle sensing system for sensing particles in a fluid which is air.

9. The system as claimed in claim 1, wherein the system is a particle sensing system for sensing pollen.

10. A method for sensing particles entrained in a fluid, the method comprising:

passing a fluid having entrained particles along a longitudinal direction of a flow channel;

obtaining an initial particle concentration measurement at a detection volume of the flow channel;

heating the fluid by an amount which depends on the initial particle concentration measurement and thereby applying a positive thermophoretic force on the fluid including a component in a direction perpendicular to the longitudinal direction of the flow channel; and sensing the particles at the detection volume of the flow channel, wherein the thermophoretic force provides a constricted space occupied by the particles within a flow of the fluid and thereby increases a concentration of the particles at the detection volume, wherein the detection volume is a sub-region of the flow channel.

11. The method as claimed in claim 10, comprising adjusting the heating of the fluid to obtain a stable sensing result.

12. The method as claimed in claim 10, comprising obtaining the initial particle concentration measurement with a second sensor before heating the particles.

13. The method as claimed in claim 10, wherein the fluid is air.

14. The method as claimed in claim 10, wherein the particles are pollen.

15. The method as claimed in claim 10, wherein the detection volume has a smaller cross sectional area than that of the flow channel.

16. The method as claimed in claim 10, wherein the heating is effected by a heating element comprising a coil or a set of coils surrounding the flow channel.

17. The method as claimed in claim 10, wherein the longitudinal direction is vertical or near vertical and a heating element is adapted to generate the fluid flow through the flow channel.

18. The method as claimed in claim 10, further comprising sensing the particles in the fluid before the heating the fluid.

19. The method as claimed in claim 10, wherein the heating comprises an independently applying heat by controlling individual heating elements.

* * * * *